(12) United States Patent
Fukase

(10) Patent No.: US 8,167,014 B2
(45) Date of Patent: May 1, 2012

(54) MANUFACTURING METHOD OF PNEUMATIC TIRE AND PNEUMATIC TIRE

(75) Inventor: Kensuke Fukase, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 900 days.

(21) Appl. No.: 12/175,583

(22) Filed: Jul. 18, 2008

(65) Prior Publication Data

US 2009/0038722 A1 Feb. 12, 2009

(30) Foreign Application Priority Data

Aug. 10, 2007 (JP) ................. 2007-209508

(51) Int. Cl.
B60C 19/08 (2006.01)
(52) U.S. Cl. ............. 152/152.1; 156/117; 156/130; 152/209.5; 152/DIG. 2
(58) Field of Classification Search .......... 156/117, 156/130; 152/152.1, 209.5, DIG. 2
See application file for complete search history.

(56) References Cited

U.S. PATENT DOCUMENTS

| | | | |
|---|---|---|---|
| 2,339,546 A | 1/1944 | Hanson | |
| 5,518,055 A | 5/1996 | Teeple et al. | |
| 5,942,069 A * | 8/1999 | Gerresheim et al. | 152/152.1 |
| 6,289,958 B1 * | 9/2001 | Dheur et al. | 152/152.1 |
| 6,367,525 B1 * | 4/2002 | Hiruma et al. | 152/152.1 |
| 6,415,833 B1 | 7/2002 | Komatsu | |
| 2007/0000585 A1 | 1/2007 | Uchida et al. | |
| 2007/0017615 A1 | 1/2007 | Nobuchika et al. | |
| 2007/0163690 A1 | 7/2007 | Nobuchika et al. | |

FOREIGN PATENT DOCUMENTS

| | | | |
|---|---|---|---|
| DE | 198 02 088 | | 7/1999 |
| EP | 0 853 010 | | 7/1998 |
| JP | 10-81110 | | 3/1998 |
| JP | 10-203114 | | 8/1998 |
| JP | 2000-190709 | * | 7/2000 |
| JP | 2004-136808 | | 5/2004 |
| JP | 2007-08269 | | 1/2007 |
| JP | 2007-08388 | | 1/2007 |
| JP | 2007-176437 | | 7/2007 |

OTHER PUBLICATIONS

German Office Action for Application No. 10 2008 036 451.7-16, dated Jun. 22, 2010 (with English translation) 6 pages.

* cited by examiner

*Primary Examiner* — Khanh P Nguyen
*Assistant Examiner* — John Blades
(74) *Attorney, Agent, or Firm* — Fish & Richardson P.C.

(57) ABSTRACT

A tread forming step of forming a non-conductive tread rubber includes a first step of forming the tread rubber in such a manner that a shoulder portion becomes smaller in diameter than a finish cross sectional shape, a second step of setting up a conductive layer extending along a tire circumferential direction while alternately passing through a first position which is exposed to a tread surface of the shoulder portion, and a second position which comes into contact with a sidewall rubber in an outer side in a tire width direction than the first position, and a third step forming a finish cross sectional shape of the tread rubber by adding a non-conductive rubber to the shoulder portion of the tread rubber.

14 Claims, 8 Drawing Sheets

(a)     (b)     (c)

20      20      20

(d)     (e)

20      20

MANUFACTURING METHOD OF PNEUMATIC TIRE AND PNEUMATIC TIRE

BACKGROUND OF THE INVENTION

1. Field of the Invention

The present invention relates to a manufacturing method of a pneumatic tire to which an electric resistance countermeasure is applied by providing a conductive layer in a non-conductive tread rubber, and the pneumatic tire.

2. Description of the Related Art

Conventionally, for the purpose of reducing a rolling resistance which has a close relation with a good mileage of a vehicle and improving a braking performance (a wet braking performance) on a wet road surface, there has been known a pneumatic tire in which a tread rubber is blended highly with a silica. However, since the tread rubber mentioned above has a high electric resistance in comparison with the structure blended highly with a carbon black, and obstructs a discharge of a static electricity generated in a vehicle body or the tire to the road surface, there is a problem that a trouble such as a radio noise or the like tends to be generated. Accordingly, there has been developed a pneumatic tire to which an electric resistance countermeasure is applied by providing a conductive layer obtained by blending a carbon black to a non-conductive tread rubber blended with a silica or the like.

For example, in a pneumatic tire described in U.S. Pat. No. 5,518,055, Japanese Unexamined Patent Publication No. 10-81110, Japanese Unexamined Patent Publication No. 10-203114, and Japanese Unexamined Patent Publication No. 2007-8269, a conductive layer is arranged in an interface between a wing rubber or a sidewall rubber and a tread rubber while coating an outer peripheral surface of an end portion of a non-conductive tread rubber, and a static electricity generated in a vehicle body or a tire is discharged to a road surface by bringing an end portion of the conductive layer into contact with a rim or a conductive rubber portion (for example, the wing rubber or the sidewall rubber) which is capable of conducting from the rim.

However, in these tire, since the conductive layer is widely exposed in an outer peripheral surface of the end portion of the tread rubber, a conductive performance is hard to be achieved if the tread rubber wears to some extent. Further, since there is a case that a conductive path is interrupted due to an irregular wear of a shoulder portion, there is a problem that the conductive performance can not be suitably maintained. Besides, since the conductive layer is provided as a sheet shape, a volume of the conductive layer becomes larger than necessary, and since the conductive layer is continuously exposed to the tread surface, there is a problem that it is impossible to sufficiently achieve an improving effect obtained by using the non-conductive tread rubber, that is, an improving effect of a mileage performance and a wet performance in the case that the tread rubber is blended highly with the silica.

U.S. Pat. No. 2,339,546 discloses a pneumatic tire in which one end of a conductive layer provided along a carcass layer is exposed to a tread surface through an inner portion of a tread rubber, and the other end comes into contact with a rim. However, since the conductive layer is formed as a sheet shape which is continuous in a tire circumferential direction, the volume of the conductive layer becomes larger than necessary as mentioned above, and since the conductive layer is continuously exposed to the tread surface, there is a tendency that an improving effect obtained by using the non-conductive tread rubber can not be sufficiently achieved. Further, Japanese Unexamined Patent Publication No. 2007-176437 describes a pneumatic tire in which a conductive layer spirally extends from a rim strip rubber (a clinch rubber) toward a tread surface, however, a conductive path becomes longer than necessary in the case mentioned above.

SUMMARY OF THE INVENTION

The present invention is made by taking the actual condition mentioned above into consideration, and an object of the present invention is to provide a manufacturing method of a pneumatic tire which can sufficiently achieves an improving effect obtained by using a non-conductive tread rubber as well as suitably maintaining a conductive performance, and the pneumatic tire.

The object can be achieved by the present invention having the following structure. That is, the present invention provides a manufacturing method of a pneumatic tire including a tread forming step of forming a non-conductive tread rubber, wherein the tread forming step includes a first step of forming the tread rubber in such a manner that a shoulder portion becomes smaller in diameter than a finish cross sectional shape, a second step of setting up a conductive layer extending along a tire circumferential direction while alternately passing through a first position which is exposed to a tread surface of the shoulder portion, and a second position which comes into contact with a rim or a conductive rubber portion being capable of conducting from the rim in an outer side in a tire width direction than the first position, and a third step forming a finish cross sectional shape of the tread rubber by adding a non-conductive rubber to the shoulder portion of the tread rubber.

In the manufacturing method of the pneumatic tire in accordance with the present invention, the non-conductive tread rubber is formed in the tread forming step, first such that the shoulder portion becomes smaller in diameter than the finish cross sectional shape. It is sufficient that the non-conductive tread rubber is formed by the non-conductive rubber at least in the tire outer circumferential side portion. Accordingly, in the case that the tread rubber has the two-layer structure constituted by the cap and the base, the cap rubber laminated in the outer circumference of the base rubber becomes formed by the non-conductive rubber.

Next, the conductive layer extending along the tire circumferential direction while changing the position in the tire width direction is provided, in such a manner as to alternately pass through the first position and the second position. The first position corresponds to the position which is exposed to the tread surface of the shoulder portion, and the second position corresponds to the position which comes into contact with the rim or the conductive rubber portion being capable of conducting from the rim in the outer side in the tire width direction from the first position. As the "conductive rubber portion being capable of conducting from the rim", there can be exemplified a sidewall rubber, a rim strip rubber, a carcass ply constructing carcass layer, and a wing rubber which is adjacent to the tread rubber.

After providing the conductive layer, the finish cross sectional shape of the tread rubber is formed by adding the non-conductive rubber to the shoulder portion of the tread rubber. Accordingly, since the conductive layer passes through the inner portion of the tread rubber, and the conductive path reaching the rim or the conductive rubber portion from the tread surface of the shoulder portion through the inner portion of the tread rubber is formed, it is possible to discharge a static electricity generated in the vehicle body and the tire to the road surface so as to prevent the problem such as the radio noise or the like from being generated.

In the present invention, since the conductive layer is provided so as to pass through the inner portion of the tread rubber from the tread surface, the conductive performance can be suitably achieved even if the tread rubber wears to some extent, and it is possible to suppress the segmentation caused by the irregular wear of the shoulder portion so as to preferably maintain the conductive performance. Further, since there is formed the linear conductive path connected to the rim or the conductive rubber portion from the tread surface of the shoulder portion, it is possible to widely reduce a volume of the conductive layer while maintaining the conductive performance, and the conductive layer is not continuously exposed to the tread surface. As a result, it is possible to sufficiently achieve an improving effect caused by using the non-conductive tread rubber, that is, an improving effect of a mileage performance and a wet performance in the case that the tread rubber is blended highly with the silica.

In the manufacturing method mentioned above, it is preferable that the tread rubber is formed in the first step, in such a manner that the shoulder portion becomes smaller in diameter toward the outer side in the tire width direction. In accordance with the structure mentioned above, since the conductive layer is provided in such a manner as to be inclined to the inner side in the tire diametrical direction toward the outer side in the tire width direction, it is possible to maintain the conductive performance up to the end stage of the wear.

In the manufacturing method mentioned above, it is preferable that the tread rubber is formed by winding a non-conductive rubber ribbon along a tire circumferential direction, in at least one of the first step and the third step. In accordance with the structure mentioned above, it is possible to precisely form the tread rubber in which the shoulder portion becomes smaller in diameter than the finish cross sectional shape, in the first step, and the conductive layer may be easily arranged at a desired position. Alternatively, it is possible to precisely form the tread rubber having the finish cross sectional shape in the third step.

In the present invention, the conductive layer may be made of the conductive liquid state material such as a rubber paste, a rubber cement or the like, however, it is preferable that the conductive layer is provided by winding a conductive filamentous rubber, in the second step. In the case mentioned above, since the thickness of the conductive layer can be secured in comparison with the conductive layer made of the conductive liquid state material, it is possible to more suitably maintain the conductive performance while suppressing the fracture and the segmentation of the conductive layer.

In the manufacturing method mentioned above, it is preferable that a cross section of the filamentous rubber is comparted into two or more regions, at least one region is made of a conductive rubber, and at least one region is made of a non-conductive rubber. In accordance with the structure mentioned above, since it is possible to further reduce the volume of the conductive layer so as to increase the volume of the non-conductive rubber in the tread rubber, it is possible to more sufficiently achieve the improving effect caused by using the non-conductive tread rubber.

Further, the present invention provides a pneumatic tire comprising:

a non-conductive tread rubber constructing a tire outer circumferential side portion of a tread portion; and a conductive layer extending along a tire circumferential direction while alternately passing through a first position which is exposed to a tread surface of the shoulder portion, and a second position which comes into contact with a rim or a conductive rubber portion being capable of conducting from the rim in an outer side in a tire width direction than the first position, and reaching the second position from the first position through an inner portion of the tread rubber.

In the pneumatic tire in accordance with the present invention, the conductive path reaching the rim or the conductive rubber portion from the tread surface of the shoulder portion through the inner portion of the tread rubber is formed by the conductive layer mentioned above. Accordingly, it is possible to discharge a static electricity generated in the vehicle body and the tire to the road surface so as to prevent the problem such as the radio noise or the like from being generated.

Further, since the conductive layer passes through the inner portion of the tread rubber from the tread surface, the conductive performance can be suitably achieved even if the tread rubber wears to some extent, and it is possible to suppress the segmentation caused by the irregular wear of the shoulder portion so as to preferably maintain the conductive performance. Moreover, since there is formed the linear conductive path connected to the rim or the conductive rubber portion from the tread surface of the shoulder portion, it is possible to widely reduce a volume of the conductive layer while maintaining the conductive performance, and the conductive layer is not continuously exposed to the tread surface. As a result, it is possible to sufficiently achieve an improving effect caused by using the non-conductive tread rubber, that is, an improving effect of a mileage performance and a wet performance in the case that the tread rubber is blended highly with the silica.

In the structure mentioned above, it is preferable that the conductive layer is made of a conductive filamentous rubber. Accordingly, since it is possible to suppress the fracture and the segmentation while securing the thickness of the conductive layer, it is possible to more suitably maintain the conductive performance.

DETAILED DESCRIPTION OF THE PREFERRED EMBODIMENTS

Figure 1:
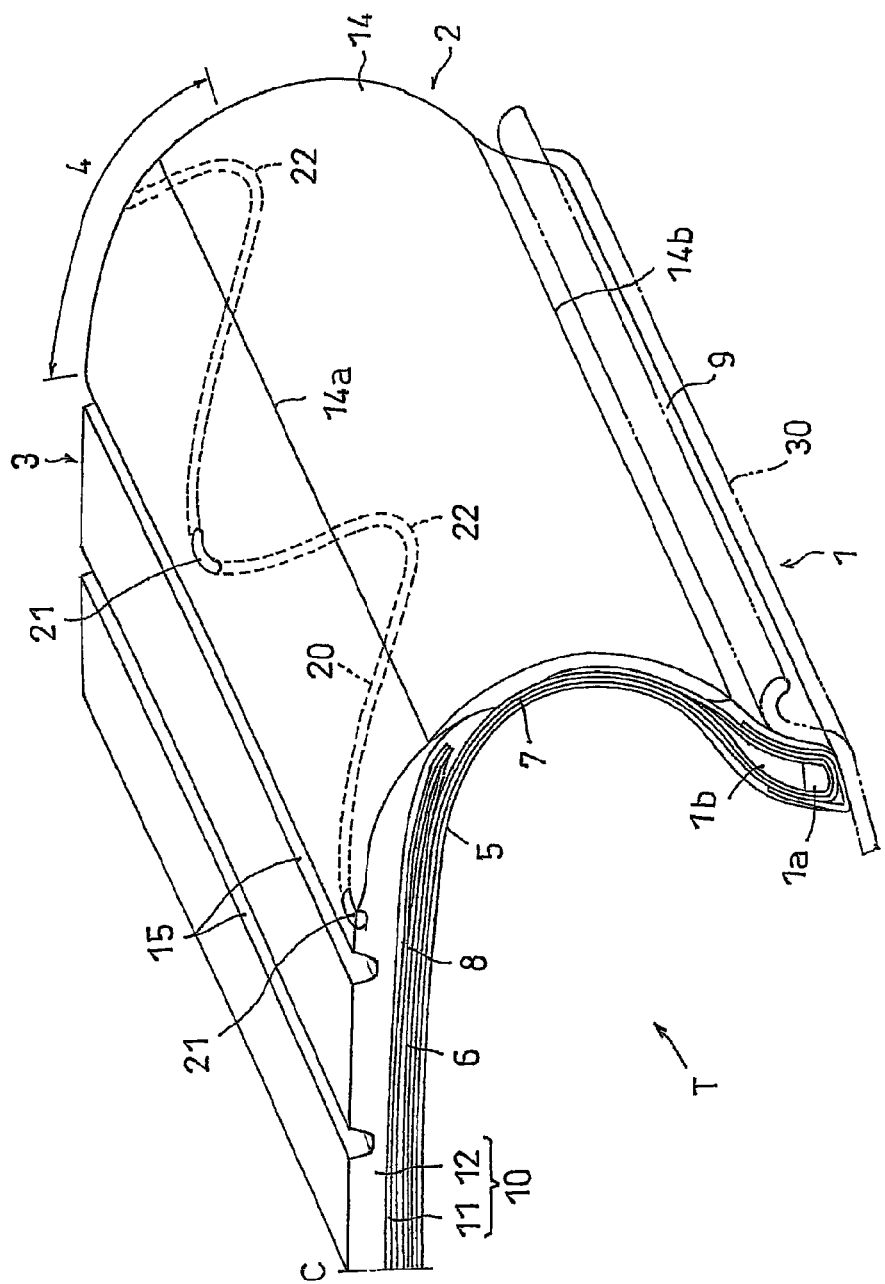
FIG. 1 is a perspective cross sectional view showing an embodiment of a pneumatic tire in accordance with the present invention.

An embodiment of the present invention will be explained with reference to the drawings. FIG. 1 is a perspective cross sectional view showing an embodiment of a pneumatic tire in accordance with the present invention.

The pneumatic tire T comprises a pair of bead portions 1, sidewall portions 2 extending from respective bead portions 1 radially outward of the tire, and tread portion 3 connected to the outer peripheral ends of the respective sidewall portions 2 through a shoulder portions(tread shoulder) 4. In the bead portion 1, an annular bead 1a formed by coating a convergence body of steel wire with rubber, and a bead filler 1b made of hard rubber.

A carcass layer 7 is constituted by at least one (two in the present embodiment) carcass ply, and is arranged in such a manner as to be bridge between the bead portions 1. The carcass play is formed by coating a cord extending at an angle of approximately 90 degree with respect to a tire equator C with a rubber, and an end portion thereof is wound up via the bead 1a. An inner liner rubber 5 for maintaining air pressure is disposed on the inner peripheral side of the carcass layer 7.

A belt layer 6 made of two belt plies is disposed on an outer peripheral side of the carcass layer 7 at the tread portion 3. The belt layer 6 reinforces the tire by means of hoop effect. Each belt ply is comprised of steel cords extending such as to be inclined by about 25° with respect to the tire equator C, and the steel cords are disposed such as to intersect with each other in opposite directions between the plies. A belt reinforcing layer 8 is disposed on the outer peripheral side of the belt layer 6.

A rim strip rubber 9 coming into contact with a rim 30 is arranged in an outer periphery of the bead portion 1 of the carcass layer 7. Further, a sidewall rubber 14 is arranged in an outer periphery of the sidewall portion 2 of the carcass layer 7. In the present embodiment, the carcass ply, the rim strip rubber 9 and the sidewall rubber 14 are formed by a conductive rubber obtained by blending a carbon black serving as a reinforcing agent at a high rate in a raw material rubber. Accordingly, each of them corresponds to "conductive rubber portion being capable of conducting from the rim".

In the outer periphery of the tread portion 3 of the carcass layer 7, a non-conductive tread rubber 10 is arranged in an outer side in a tire diametrical direction of the belt layer 6 and the belt reinforcing layer 8. The tread rubber 10 in accordance with the present embodiment has a two-layer structure constituted by a base rubber 11, and a cap rubber 12 laminated in an outer periphery of the base rubber 11 and constructing a tire outer circumferential side portion of the tread portion 3. Further, there is employed a so-called side-on tread structure obtained by laminating the outer end portion in the tire diametrical direction of the sidewall rubber 14 on the outer peripheral surface of the end portion of the tread rubber 10.

The cap rubber 12 is formed by a non-conductive rubber obtained by blending the silica serving as the reinforcing agent at a high rate in the raw material rubber, whereby it is possible to achieve excellent mileage performance and wet braking performance. The base rubber 11 may be formed by the conductive rubber, however, may be formed by the non-conductive rubber in the present invention. Accordingly, it is possible to blend the silica highly in both the base rubber 11 and the cap rubber 12, and in this case, it is possible to effectively reduce a rolling resistance of the tire so as to well improve the mileage performance.

The conductive rubber is exemplified by the conductive rubber indicating a conductivity in which a specific volume resistance is less than $10^8$ Ωcm, and can be obtained by blending a predetermined amount of known conductivity applying material such as a carbon including a carbon fiber, a graphite and the like, or a metal including a metal powder, a metal oxide, a metal flake, a metal fiber and the like in addition to the carbon black. Further, the non-conductive rubber is exemplified by the non-conductive rubber in which the specific volume resistance is equal to or more than $10^8$ Ωcm.

Examples of raw material rubbers for the conductive rubber and the non-conductive rubber are natural rubber, styrene-butadiene rubber (SBR), butadiene rubber (BR), isoprene rubber (IR), butyl rubber (IIR) and the like. These rubbers are used alone or a combination thereof. Cure, accelerator, plasticizer, antioxidant or the like is appropriately mixed to the raw material rubber.

Various tread patterns constituted by groove portions and land portions are formed on the tread surface, however, FIG. 1 shows only a main groove 15 extending in the tire circumferential direction. As the groove portion, in addition to the main groove 15, there can be appropriately provided with a transverse groove or an inclined groove extending so as to cut across the main groove 15, a sub groove which is shallower than the main groove 15 and the like. In this case, reference symbol 14a denotes an outer end in a tire diametrical direction of the sidewall rubber 14, and reference symbol 14b denotes an inner end in the tire diametrical direction of the sidewall rubber 14.

Figure 2:
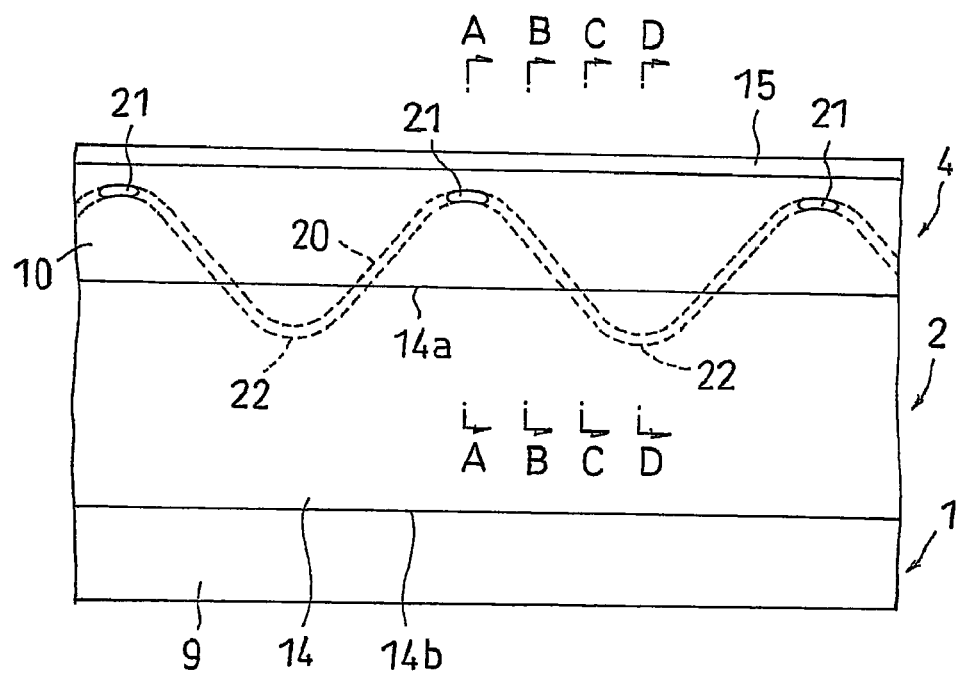
FIG. 2 is an expansion plan view showing a tire outer surface in a range from a bead portion to a shoulder portion.

FIG. 2 is an expansion plan view showing the tire outer surface of the pneumatic tire T in a range from a bead portion 1 to a shoulder portion 4. FIGS. 3(A), 3(B), 3(C) and 3(D) respectively correspond to a cross section as seen from an arrow A-A, a cross section as seen from an arrow B-B, a cross section as seen from an arrow C-C and a cross section as seen from an arrow D-D in FIG. 2.

Figure 3:
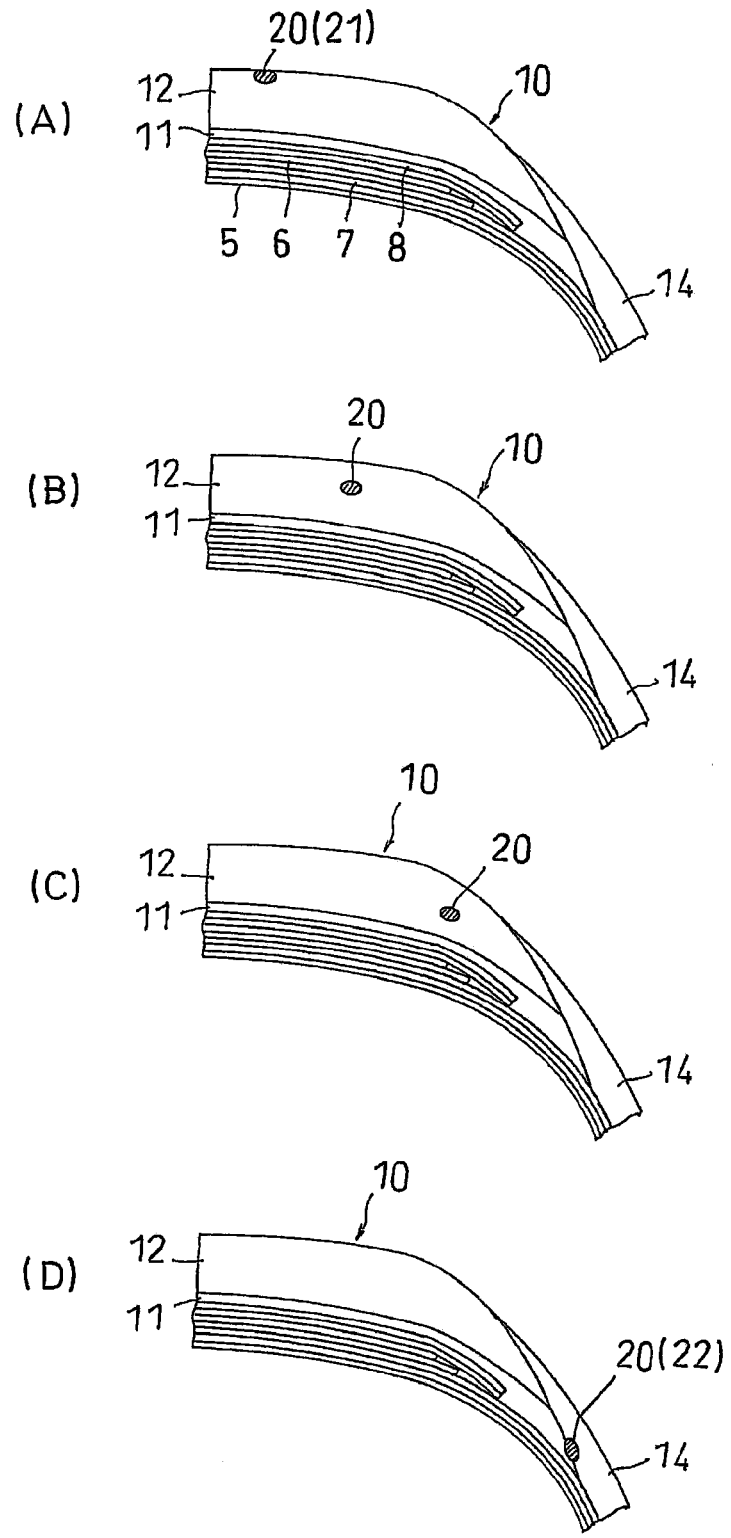
FIG. 3 is a view showing a cross section as seen from an arrow A-A to an arrow D-D in FIG. 2.

The pneumatic tire T is provided with a conductive layer 20 extending along the tire circumferential direction while alternately passing through a first position 21 which is exposed to the tread surface of the shoulder portion 4, and a second position 22 coming into contact with the sidewall rubber 14 in an outer side in the tire width direction than the first position 21, as shown in FIGS. 1 to 3. The conductive layer 20 meanders while changing its position in the tire width direction, and reaches the second position 22 from the first position 21 through the inner portion of the tread rubber 10 (the inner portion of the cap rubber 12).

On the basis of the conductive layer 20, there is formed a conductive path reaching the sidewall rubber 14 from the tread surface of the shoulder portion 4 through the inner portion of the tread rubber 10. The static electricity generated in the vehicle body is discharged to the road surface from a rim 30 through the rim strip rubber 9, the sidewall rubber 14 and the conductive layer 20, whereby it is possible to prevent the problem such as the radio noise or the like from being generated.

Since the conductive layer 20 passes through the inner portion of the tread rubber 10 from the tread surface, the conductive performance can be suitably achieved even if the tread rubber 10 wears to some extent, and it is possible to suppress the segmentation caused by the irregular wear of the shoulder portion 4 so as to preferably maintain the conductive performance. In the present embodiment, since the conductive layer 20 is provided in such a manner as to be inclined to the inner side in the tire diametrical direction toward the outer side in the tire width direction, it is possible to sufficiently maintain the conductive performance to the end stage of the wear.

Further, since the conductive layer 20 has the form as mentioned above, there are formed a plurality of linear conductive paths connected to the sidewall rubber 14 from the tread surface of the shoulder portion 4 while alternately changing the direction of incline with respect to the tire circumferential direction. Accordingly, it is possible to widely reduce a volume of the conductive layer 20 while maintaining the conductive performance, and the conductive layer 20 is not continuously exposed to the tread surface. As a result, it is possible to sufficiently achieve an improving effect of a mileage performance and a wet performance caused by the tread rubber 10 blended highly with the silica.

The conductive layer 20 in accordance with the present embodiment is formed by a conductive filamentous rubber obtained by forming a conductive rubber in a filamentous shape by an extruder or the like. Accordingly, a thickness of the conductive layer 20 is secured in comparison with a thin membrane shaped conductive layer made of a rubber paste or a rubber cement, and it is possible to suppress the fracture and the segmentation so as to suitably maintain the conductive performance.

The conductive layer 20 maybe provided only in the shoulder portion 4 in one side, however, it is preferable that the conductive layer 20 is provided in the shoulder portions 4 in both sides in the tire width direction, whereby even in the case that an irregular wear is generated in the tread portion 3, it is possible to suitably maintain the conductive performance. Further, it is preferable that the conductive layer 20 is formed as an annular shape along the tire circumferential direction as a whole. Accordingly, it is possible to increase a contact frequency between the conductive layer 20 and the road surface so as to sufficiently secure the conductive performance.

A length of one cycle of the conductive layer 20 (a length in the tire circumferential direction between the first positions 21) is not particularly limited as far as a demanded conductive performance can be suitably achieved, however, it is preferable that the length is equal to or less than a contact length in the shoulder portion 4. Accordingly, since the conductive layer 20 is exposed at least at one position within the contact surface, it is possible to secure a contact frequency between the conductive layer 20 and the road surface so as to sufficiently achieve the conductive performance.

The pneumatic tire in accordance with the present invention is similar to a normal pneumatic tire except provision of the non-conductive tread rubber and the conductive layer as mentioned above, and it is possible to employ the conventionally known material, shape, structure and the like to the present invention.

Next, a description will be given of a method of manufacturing the pneumatic tire T with reference to FIGS. 4 to 8. The manufacturing method of the pneumatic tire in accordance with the present invention can be carried out in the same manner as the normal tire manufacturing except the tread forming step forming the non-conductive tread rubber 10. The tread forming step is structured as follows.

In the present embodiment, there is shown an example in which an unvulcanized green tire is shaped by forming the tread rubber 10, the sidewall rubber 14 and the rim strip rubber 9 on the partial tire PT. The partial tire PT is provided with a pair of bead portions 1, and the carcass layer 7 arranged between the bead portions 1, and is structured such that the inner liner rubber 5 is arranged in an inner periphery of the carcass layer 7. The partial tire PT is supported by a rotation support body such as a forming drum, a rigid core or the like so as to be rotatable in the tire circumferential direction (refer to FIG. 5).

The tread forming step includes a first step of forming the tread rubber 10 in such a manner that the shoulder portion 4 becomes smaller in diameter than the finish cross sectional shape, a second step of setting the conductive layer 20 along the tire circumferential direction, and a third step of forming the finish cross sectional shape of the tread rubber 10. A description will be in detail given below of these steps.

Figure 4:
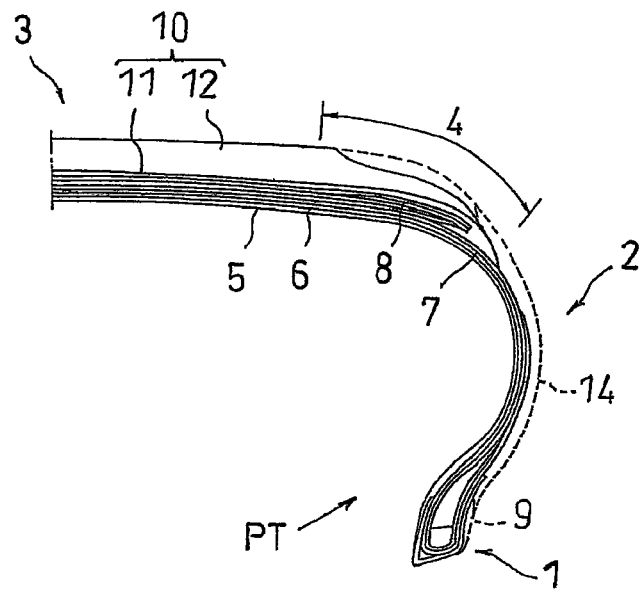
FIG. 4 is a cross sectional view for explaining a manufacturing method of a pneumatic tire in accordance with the present invention.

First, the first step forms the tread rubber 10 in such a manner that the shoulder portion 4 becomes smaller in diameter than the finish cross sectional shape on the partial tire PT in which the belt layer 6 and the belt reinforcing layer 8 are formed, as shown in FIG. 4. FIG. 4 shows an outline of the finish cross sectional shape of the tread rubber 10, the rim strip rubber 9 and the sidewall rubber 14 by a broken line. The shoulder portion 4 of the tread rubber 10 becomes smaller in diameter toward the outer side in the tire width direction, and an outer surface thereof is formed by a gentle curved surface.

Figure 5:
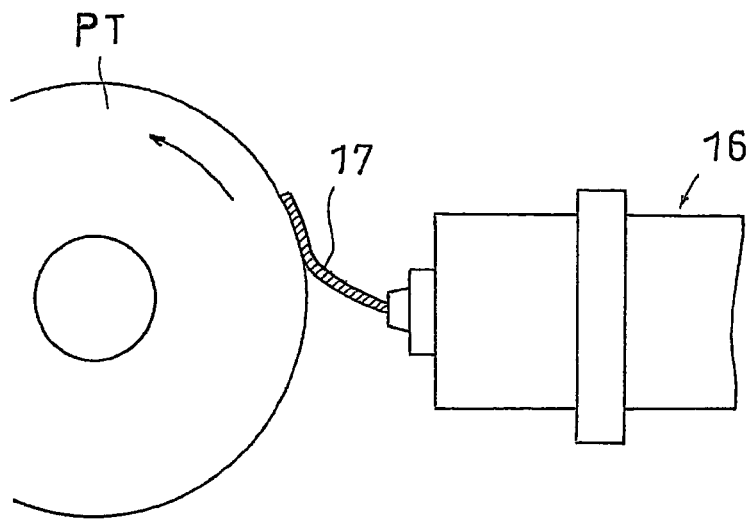
FIG. 5 is an explanatory view schematically showing a state in which a rubber ribbon is wound on a partial tire.

The formation of the tread rubber 10 can be carried out by winding a rubber ribbon 17 fed from a rubber ribbon feed apparatus 16 on the partial tire PT as shown in FIG. 5, whereby it is possible to precisely form a cross sectional shape of the tread rubber 10. A non-conductive rubber ribbon is used as the rubber ribbon 17 for forming at least the cap rubber 12 of the tread rubber 10.

Figure 6:
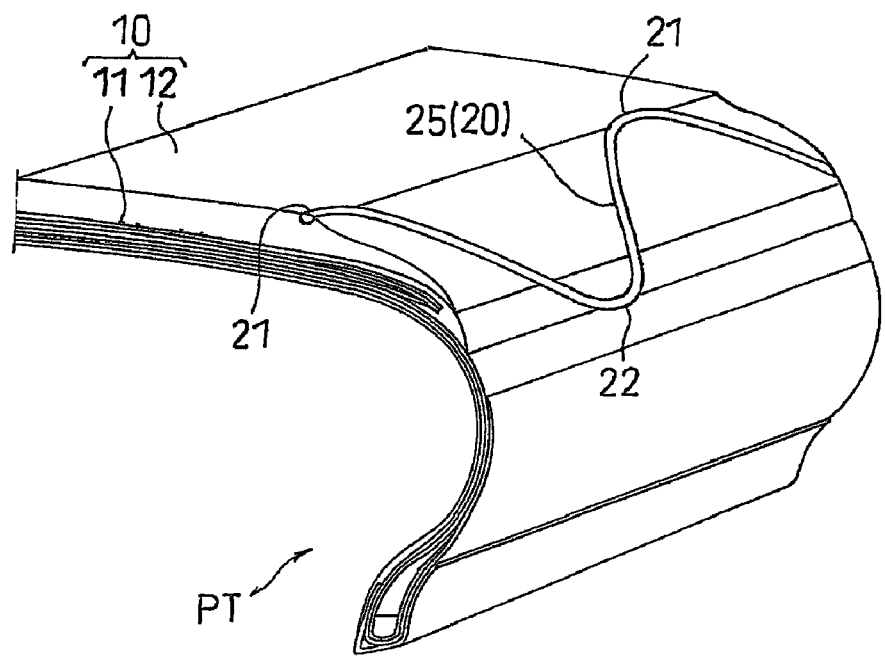
FIG. 6 is a perspective cross sectional view for explaining a manufacturing method of a pneumatic tire in accordance with the present invention.

Next, the second step sets up the conductive layer 20 extending while meandering along the tire circumferential direction, while alternately passing through the first position 21 which is exposed to the tread surface of the shoulder portion 4 and the second position 22 which comes into contact with the sidewall rubber 14, as shown in FIG. 6. The second position 22 is positioned on the outer peripheral surface of the end portion of the base rubber 11, whereby the conductive layer 20 comes into contact with the sidewall rubber 14 provided on the second position 22.

In the present embodiment, the conductive layer 20 is formed by a conductive filamentous rubber 25. In other words, the filamentous rubber 25 is wound while meandering along the tire circumferential direction in such a manner as to alternately pass through the first position 21 which is exposed to the tread surface of the shoulder portion 4, and the second position 22 which comes into contact with the sidewall rubber 14. The winding as mentioned above can be easily carried out by changing a winding position of the filamentous rubber 25 in the tire width direction while rotating the partial tire PT.

Figure 7:
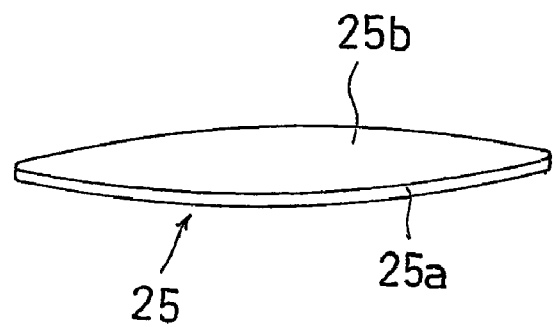
FIG. 7 is a cross sectional view of a filamentous rubber.

The filamentous rubber 25 may be formed in one layer by the conductive rubber, however, it is preferable that a cross section thereof is comparted into two or more regions, at least one region is made of the conductive rubber, and at least one region is made of the non-conductive rubber. FIG. 7 shows an example in which the cross section of the filamentous rubber 25 is comparted by a region 25a made of the conductive rubber, and a region 25b made of the same non-conductive rubber as the cap rubber 12. In accordance with the filamentous rubber 25 mentioned above, since it is possible to regulate the volume of the conductive rubber, it is possible to reduce the volume of the conductive layer 20 while maintaining the cross sectional area thereof. Accordingly, for example, it is possible to increase the volume of the non-conductive rubber in the tread rubber 10 so as to sufficiently achieve the improving effect of the mileage performance and the wet performance.

A size of the filamentous rubber 25 is not particularly limited as far as a demanded conductive performance can be suitably achieved. Further, the cross sectional shape of the filamentous rubber 25 is not particularly limited, but can employ a circular shape, a rectangular shape, a triangular shape, a semicircular shape and the like in addition to an oval shape as shown in FIG. 7.

Figure 8:
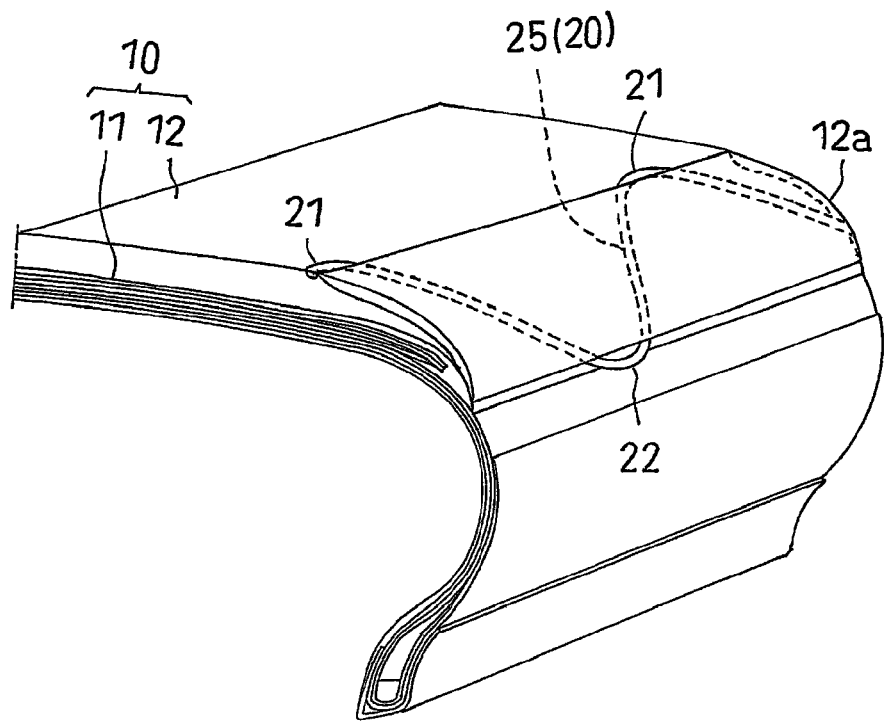
FIG. 8 is a perspective cross sectional view for explaining a manufacturing method of a pneumatic tire in accordance with the present invention.

Subsequently, the third step adds the non-conductive rubber 12a in such a manner as to compensate a shortfall with respect to the shoulder portion 4 of the tread rubber 10 so as to form the finish cross sectional shape of the tread rubber 10, as shown in FIG. 8. Accordingly, the conductive layer 20 reaches the sidewall rubber 14 from the tread surface through the inner portion of the tread rubber 10. The pneumatic tire as shown in FIG. 1 is formed by thereafter forming the finish cross sectional shape of the rim strip rubber 9 and the sidewall rubber 14 and applying a vulcanizing process. The rim strip rubber 9 and the sidewall rubber 14 can be formed by attaching an annular rubber extruded product having a predetermined cross sectional shape or winding a conductive rubber ribbon by using an apparatus as shown in FIG. 5.

The finish cross sectional shapes of the tread rubber 10, the rim strip rubber 9 and the sidewall rubber 14 can be precisely formed by winding the rubber ribbon in the same manner as the first step. In this case, the finish cross sectional shape of the tread rubber 10 or the like is a cross sectional shape demanded for forming the green tire before being vulcanized, and it is not necessary that the finish cross sectional shape does not coincide with the cross sectional shape shown in FIG. 1.

[Other Embodiments]

(1) In the embodiment mentioned above, there is shown the example in which the tread rubber has the two-layer structure including the cap and the base, however, the present invention is not limited to this, but may be structured such that the tread rubber is formed in one layer by the non-conductive rubber. Further, the tread rubber is not limited to be formed by winding the rubber ribbon, but may be formed by annularly connecting the rubber extruded products. In this case, the first step uses the tread rubber extruded product in which the shoulder portion becomes smaller in diameter than the finish cross sectional shape, and the third step uses the rubber extruded product having the shape which can form the finish cross sectional shape of the tread rubber by compensating the shortfall of the shoulder portion.

(2) In the embodiment mentioned above, there is shown the example in which the outer surface of the shoulder portion of the tread rubber is formed by the gentle curved surface in the first step, however, the structure may be made such that the shoulder portion becomes smaller in diameter toward the outer side in the tire width direction by forming the outer surface of the shoulder portion by a taper-shaped surface or a step-shaped surface.

(3) In the present invention, the second position 22 may exist on the carcass layer 7, and the conductive layer 20 can be brought into contact with the sidewall rubber 14 even in the case mentioned above. Further, since the conductive layer 20 comes into contact with the carcass ply, it is possible to further reduce the rolling resistance of the tire by forming the sidewall rubber 14 by the non-conductive rubber. The static electricity generated in the vehicle body is discharged to the road surface from the rim 30 through the rim strip rubber 9, the carcass ply and the conductive layer 20.

Figure 9:
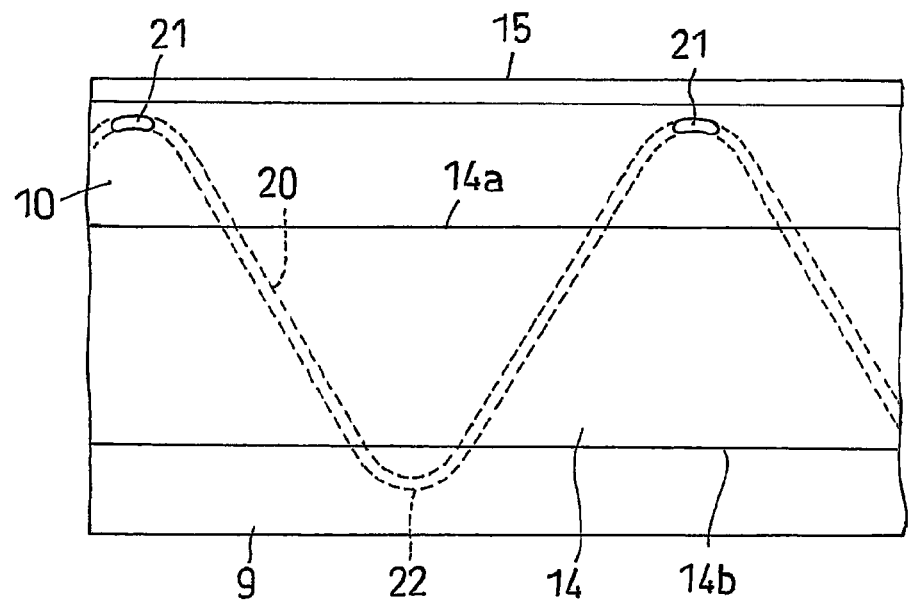
FIG. 9 is an expansion plan view of a tire outer surface in accordance with the other embodiment of the present invention.

(4) In the present invention, as shown in FIG. 9, the conductive layer 20 can be brought into contact with the rim strip rubber 9. In this case, in order to further reduce the rolling resistance of the tire, the sidewall rubber 14 and the carcass ply can be formed by the non-conductive rubber. The static electricity generated in the vehicle body is discharged to the road surface from the rim 30 through the rim strip rubber 9 and the conductive layer 20. Further, in the case that the rim strip rubber 9 is formed by the non-conductive rubber, the conductive layer 20 may be exposed to the surface of the rim strip rubber 9 and be brought into contact with the rim 30.

(5) In the present invention, there may be employed a so-called tread-on side structure in which the outer peripheral surface of the end portion of the tread rubber is laminated on the outer end portion in the tire diametrical direction of the sidewall rubber, and in the case that the conductive wing rubber is arranged so as to be adjacent to the tread rubber, the conductive layer may be brought into contact with the wing rubber.

Figure 10:
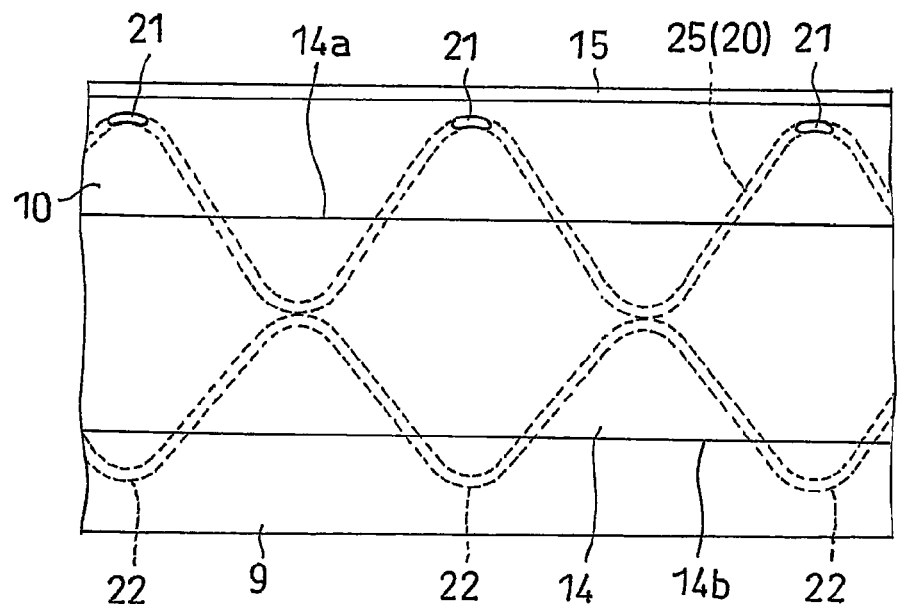
FIG. 10 is an expansion plan view of a tire outer surface in accordance with the other embodiment of the present invention.

(6) In the embodiment mentioned above, there is shown the example in which the conductive layer 20 is provided by winding the filamentous rubber 25 one full circle in the tire circumferential direction, however, the conductive layer 20 may be provided by winding the filamentous rubber 25 two full circles or more so that a contact point is formed, and the outer portion in the tire width direction may be brought into contact with the conductive rubber portion (the rim strip rubber 9 in the illustrated example), as shown in FIG. 10.

Figure 11:
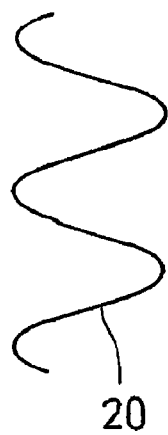
FIG. 11 is a schematic view showing an example of a winding pattern of the filamentous rubber.
Figure 11:
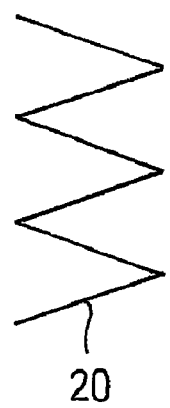
Figure 11:
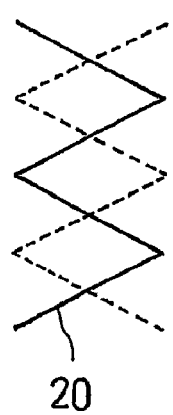
Figure 11:
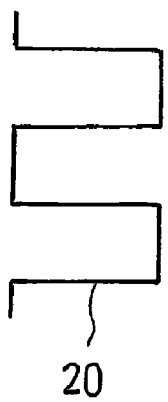
Figure 11:
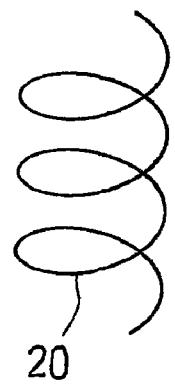

(7) In the embodiment mentioned above, there is shown the example in which the conductive layer 20 extends in a meandering manner as shown in FIG. 11(*a*), however, the present invention is not limited to this, but may be structured such that the conductive layer 20 extends as shown in FIGS. 11(*b*) to 11(*e*). FIG. 11(*b*) shows an example in which the conductive layer 20 extends in a zigzag manner along the tire circumferential direction (a vertical direction in FIG. 11), and FIG. 11(*c*) shows an example in which the conductive layer 20 are wound two full circles. FIG. 11(*d*) shows an example in which the conductive layer 20 extends in a rectangular wavy shape, and FIG. 11(*e*) shows an example in which the conductive layer 20 extends spirally. The conductive layer mentioned above can be provided by appropriately regulating the position in the tire width direction of the filamentous rubber, and a rotating amount and a rotating direction of the partial tire PT, at a time of winding the filamentous rubber.

Embodiment

An example tire which concretely shows the structure and effect of the present invention will be explained. An evaluation of each of performances is executed as follows.

(1) Conductive Performance

An electric resistance value is measured by applying a load obtained by maximum load×0.88×0.8 in accordance with the standard mentioned below to a tire prepared in a measuring rim width designated by ETRTO/JATMA/TRA while setting an internal pressure to 200 kPa, and applying an applied voltage (500 V) to a metal plate grounded by the tire from a shaft supporting the rim. The measurement mentioned above is carried out in two stages including a new product time which is not worn, and a 50% wearing time at which the tire wears 50% of the main groove depth.

(2) Wet Performance

The tire is installed to an actual car, and a braking distance from a traveling speed 100 km/h to a vehicle stop is measured on the wet road surface. An index number evaluation is carried out by setting the comparative example 1 to 100, and a greater index number indicates a shorter braking distance and an excellent wet performance.

(3) Mileage Performance (Rolling Resistance)

A rolling resistance at a traveling speed 80 km/h is measured by using the tire prepared in the measuring rim width designated by ETRTO/JATMA/TRA while setting the internal pressure to 200 kPa and carrying out a test. An index number evaluation is carried out by setting the comparative example 1 to 100, and a greater index number indicates a smaller rolling resistance and a good mileage.

Comparative Example 1

A comparative example 1 is set to a pneumatic tire (tire size: 225/55R17 101W) in which a cap rubber constructing the tread rubber is formed by the non-conductive rubber and the conductive layer is not provided in the tread rubber. The non-conductive rubber employs a reinforcing agent obtained by adding the silica at 30% weight ratio and the carbon black at 7% weight ratio (the same matter is applied to the other examples).

Comparative Example 2

A comparative example 2 is set to a pneumatic tire which is the same as the comparative example 1 except the structure in which the conductive layer is provided by arranging the rubber sheet formed by the conductive rubber in a region reaching a bottom surface from the outer peripheral surface of the end portion of the tread rubber via the side surface. The conductive rubber employs a reinforcing agent obtained by adding the silica at 0% weight ratio and the carbon black at 31% weight ratio (the same matter is applied to the other examples).

Examples 1 to 10

Examples are set to a pneumatic tire which is the same as the comparative example 1 except the structure in which the conductive layer shown by the embodiment mentioned above is provided in the tread rubber. In this case, the conductive layer is formed by the filamentous rubber made of the conductive rubber mentioned above, a cross sectional shape, a width, a thickness, a contact frequency with the sidewall rubber in the tire circumferential direction, and a winding pattern (refer to FIG. 11) of the filamentous rubber are shown in Table 1. Results of the evaluation are shown in Table 2.

TABLE 1

|  |  | Example 1 | Example 2 | Example 3 | Example 4 | Example 5 |
|---|---|---|---|---|---|---|
| Filamentous rubber | Cross sectional shape | Oval | Oval | Oval | Oval | Oval |
|  | Width (mm) | 6 | 12 | 6 | 6 | 6 |
|  | Thickness (mm) | 0.8 | 0.8 | 1.6 | 1.6 | 0.8 |
| Contact frequency with sidewall rubber |  | 16 | 16 | 16 | 32 | 16 |
| Winding pattern |  | FIG. 11(a) | FIG. 11(a) | FIG. 11(a) | FIG. 11(a) | FIG. 11(b) |

|  |  | Example 6 | Example 7 | Example 8 | Example 9 | Example 10 |
|---|---|---|---|---|---|---|
| Filamentous rubber | Cross sectional shape | Oval | Oval | Oval | Circular | Rectangular |
|  | Width (mm) | 6 | 6 | 6 | 3 | 6 |
|  | Thickness (mm) | 0.8 | 0.8 | 0.8 | 3 | 0.8 |
| Contact frequency with sidewall rubber |  | 32 | 16 | 16 | 16 | 16 |
| Winding pattern |  | FIG. 11(c) | FIG. 11(e) | FIG. 11(d) | FIG. 11(a) | FIG. 11(a) |

TABLE 2

|  |  | Comparative example 1 | Comparative example 2 |
|---|---|---|---|
| Electric resistance ($\Omega$) | New product time | 1.00E+09 | 5.60E+06 |
|  | 50% wearing time | 1.00E+11 | 1.30E+10 |
| Wet performance |  | 100 | 95 |
| Mileage performance |  | 100 | 95 |

|  |  | Example 1 | Example 2 | Example 3 | Example 4 | Example 5 |
|---|---|---|---|---|---|---|
| Electric resistance ($\Omega$) | New product time | 7.80E+06 | 2.80E+06 | 3.10E+06 | 1.10E+06 | 7.90E+06 |
|  | 50% wearing time | 1.20E+07 | 9.00E+06 | 7.70E+06 | 3.20E+06 | 1.10E+07 |
| Wet performance |  | 99 | 99 | 99 | 98 | 99 |
| Mileage performance |  | 97 | 95 | 95 | 94 | 97 |

|  |  | Example 6 | Example 7 | Example 8 | Example 9 | Example 10 |
|---|---|---|---|---|---|---|
| Electric resistance ($\Omega$) | New product time | 3.20E+06 | 6.20E+06 | 5.10E+06 | 8.10E+06 | 7.80E+06 |
|  | 50% wearing time | 8.00E+06 | 1.20E+07 | 1.00E+07 | 1.30E+07 | 1.20E+07 |

TABLE 2-continued

| Wet performance | 99 | 99 | 99 | 99 | 99 |
| Mileage performance | 95 | 97 | 97 | 97 | 97 |

As shown in Table 1, the conducting effect is not achieved in the comparative example 1. In the case mentioned above, there is a risk that the electricity is accumulated in the vehicle body so as to generate the problem such as the radio noise or the like. In the comparative example 2, the conducting effect is achieved in the early stage of the wear, however, the conductive performance is deteriorated at the 50% wearing time. On the contrary, in the examples 1 to 10, the conductive performance can be maintained even at the 50% wearing time in addition to the new product time. Further, since the conductive layer is not continuously exposed to the tread surface while widely reducing the volume of the conductive layer, it is possible to well secure the wet performance and the mileage performance.

What is claimed is:

1. A manufacturing method of a pneumatic tire having a plurality of first and second positions, respectively, at intervals along a tire circumferential direction and including a tread forming step of forming a non-conductive tread rubber, wherein the tread forming step includes a first step of forming the tread rubber in such a manner that a shoulder portion becomes smaller in diameter toward the outside in the tire width direction, a second step of setting up a conductive layer extending along a tire circumferential direction while alternately passing through the plurality of first positions which are exposed to a tread surface of the shoulder portion, and the plurality of the second positions which are outside of the first positions in the tire width direction, and which come into contact with a rim or a conductive rubber portion being capable of conducting from the rim, and a third step of forming a finish cross sectional shape of the tread rubber by adding a non-conductive rubber to the shoulder portion of the tread rubber.

2. The manufacturing method of a pneumatic tire according to claim 1, wherein the tread rubber is formed by winding a non-conductive rubber ribbon along a tire circumferential direction, in at least one of the first step and the third step.

3. The manufacturing method of a pneumatic tire according to claim 1, wherein the conductive layer is provided by winding a conductive filamentous rubber, in the second step.

4. The manufacturing method of a pneumatic tire according to claim 3, wherein a cross section of the filamentous rubber is comparted into two or more regions, at least one region is made of a conductive rubber, and at least one region is made of a non-conductive rubber.

5. A pneumatic tire comprising:
a non-conductive tread rubber constructing a tire outer circumferential side portion of a tread portion; and
a conductive layer extending along a tire circumferential direction while alternately passing through a plurality of first positions which are exposed to a tread surface of a shoulder portion, and a plurality of second positions which are outside of the first positions in the tire width direction, and which come into contact with a rim or a conductive rubber portion being capable of conducting from the rim, and reaching the second positions from the first positions through an inner portion of the tread rubber.

6. The pneumatic tire according to claim 5, wherein the conductive layer is made of a conductive filamentous rubber.

7. The manufacturing method of a pneumatic tire according to claim 1, wherein the conductive layer is formed as an annular shape along the tire circumferential direction as a whole.

8. The manufacturing method of a pneumatic tire according to claim 7, wherein a plurality of conductive paths are formed while alternately changing the direction of incline with respect to the tire circumferential direction.

9. The manufacturing method of a pneumatic tire according to claim 1, wherein a plurality of conductive paths are formed while alternately changing the direction of incline with respect to the tire circumferential direction.

10. The manufacturing method of a pneumatic tire according to claim 9, wherein the conductive layer extends in a serpentine configuration along the tire circumferential direction.

11. The pneumatic tire according to claim 5, wherein the conductive layer is formed as an annular shape along the tire circumferential direction as a whole.

12. The pneumatic tire according to claim 11, wherein a plurality of conductive paths are formed while alternately changing the direction of incline with respect to the tire circumferential direction.

13. The pneumatic tire according to claim 5, wherein a plurality of conductive paths are formed while alternately changing the direction of incline with respect to the tire circumferential direction.

14. The pneumatic tire according to claim 13, wherein the conductive layer extends in a serpentine configuration along the tire circumferential direction.

* * * * *

UNITED STATES PATENT AND TRADEMARK OFFICE
CERTIFICATE OF CORRECTION

| | |
|---|---|
| PATENT NO. | : 8,167,014 B2 |
| APPLICATION NO. | : 12/175583 |
| DATED | : May 1, 2012 |
| INVENTOR(S) | : Kensuke Fukase |

Page 1 of 1

It is certified that error appears in the above-identified patent and that said Letters Patent is hereby corrected as shown below:

Column 13, Line 34 (Claim 1, line 12), delete "of the" and insert --of--.

Signed and Sealed this
Tenth Day of July, 2012

David J. Kappos
*Director of the United States Patent and Trademark Office*